United States Patent
Louis et al.

(10) Patent No.: US 11,851,526 B2
(45) Date of Patent: Dec. 26, 2023

(54) POLY(ETHER KETONE KETONE) POLYMER POWDER HAVING A LOW VOLATILES CONTENT

(71) Applicant: SOLVAY SPECIALTY POLYMERS USA, LLC, Alpharetta, GA (US)

(72) Inventors: Chantal Louis, Alpharetta, GA (US); Scott A. Harding, Alpharetta, GA (US)

(73) Assignee: SOLVAY SPECIALTY POLYMERS USA, LLC, Alpharetta, GA (US)

(*) Notice: Subject to any disclaimer, the term of this patent is extended or adjusted under 35 U.S.C. 154(b) by 517 days.

(21) Appl. No.: 16/624,281

(22) PCT Filed: Jul. 2, 2018

(86) PCT No.: PCT/EP2018/067807
§ 371 (c)(1),
(2) Date: Dec. 18, 2019

(87) PCT Pub. No.: WO2019/002620
PCT Pub. Date: Jan. 3, 2019

(65) Prior Publication Data
US 2021/0147625 A1    May 20, 2021

Related U.S. Application Data

(60) Provisional application No. 62/527,718, filed on Jun. 30, 2017.

(51) Int. Cl.
*C08G 65/40* (2006.01)
*C08J 3/12* (2006.01)
*B33Y 70/00* (2020.01)
*B33Y 80/00* (2015.01)

(52) U.S. Cl.
CPC .......... *C08G 65/4056* (2013.01); *C08J 3/12* (2013.01); *B33Y 70/00* (2014.12); *B33Y 80/00* (2014.12); *C08G 2650/40* (2013.01); *C08J 2371/10* (2013.01)

(58) Field of Classification Search
CPC .......... C08G 65/4056; C08G 2650/40; C08G 75/23; C08G 75/20; C08J 3/12; C08J 2371/10; B33Y 70/00; B33Y 80/00; C08L 81/06
See application file for complete search history.

(56) References Cited

U.S. PATENT DOCUMENTS

| | | | |
|---|---|---|---|
| 4,906,784 A | 3/1990 | Skoler | |
| 5,250,738 A | 10/1993 | Hackenbruch et al. | |
| 5,300,693 A | 4/1994 | Gilb et al. | |
| 9,133,111 B2 | 9/2015 | Louis et al. | |
| 9,175,136 B2 | 11/2015 | Louis | |
| 2006/0134419 A1* | 6/2006 | Monsheimer | B29C 64/153 528/125 |
| 2011/0201775 A1* | 8/2011 | Louis | C08G 65/4012 568/34 |
| 2015/0183918 A1 | 7/2015 | Le et al. | |

FOREIGN PATENT DOCUMENTS

| | | |
|---|---|---|
| CN | 1974631 A | 6/2007 |
| DE | 102008024288 A1 | 12/2009 |
| EP | 0323076 A2 | 7/1989 |
| GB | 1250225 A | 10/1971 |
| GB | 1563224 A | 3/1980 |
| IN | 193687 B | 7/2014 |
| WO | 2013085947 A1 | 6/2013 |
| WO | 2017194855 A1 | 11/2017 |
| WO | 2018/115033 A1 | 6/2018 |

OTHER PUBLICATIONS

ASTM D3850-12—Standard Test Method for Rapid Thermal Degradation of Solid Electrical Insulating Materials By Thermogravimetric Method (TGA), 2012, p. 1-4.
ISO 9277-2010—Standard Determination of the specific surface area of solids by gas adsorption—BET method, 2010, p. 1-24.
ASTM D3418-08—Standard Test Method for Transition Temperatures and Enthalpies of Fusion and Crystallization of Polymers by Differential Scanning Calorimetry, 2008, p. 1-7.
Emel Y. et al., "Thermal and Mechanical Properties of Poly(arylene ether ketone)s having Pendant Tertiary Butyl Groups", Journal of Polymer Research, Kluwer Academic Publishers-Consultants Bureau, NL, vol. 14, No. 1, Nov. 3, 2006 (Nov. 3, 2006), pp. 61-66, XP019466913, ISSN: 1572-8935.

* cited by examiner

*Primary Examiner* — Shane Fang
(74) *Attorney, Agent, or Firm* — Osha Bergman Watanabe & Burton LLP

(57) ABSTRACT

A PEKK polymer powder, having a $d_{0.9}$-value less than 150 μm, wherein the PEKK polymer has a Td(1%) of at least 500° C., as measured by thermal gravimetric analysis according to ASTM D3850, heating from 30° C. to 800° C. under nitrogen using a heating rate of 10° C./min. A method for producing a PEKK powder for the use in a method for manufacturing a 3D object, in which the PEKK has a Td(1%) of at least 500° C., as measured by thermal gravimetric analysis according to ASTM D3850, heating from 30° C. to 800° C. under nitrogen using a heating rate of 10° C./min, and the powder has been manufactured by grinding from a coarser powder and has a $d_{0.9}$-value less than 150 μm, as measured by laser scattering in isopropanol.

23 Claims, No Drawings

POLY(ETHER KETONE KETONE) POLYMER POWDER HAVING A LOW VOLATILES CONTENT

RELATED APPLICATIONS

This application is a U.S. national stage entry under 35 U.S.C. § 371 of International Application No. PCT/EP2018/067807 filed Jul. 2, 2018, which claims priority to U.S. provisional patent application No. 62/527,718, filed on Jun. 30, 2017, the whole content of this application being incorporated herein by reference for all purposes.

TECHNICAL FIELD

The present invention relates to a PEKK polymer powder, having a $d_{0.9}$-value less than 150 μm, wherein the PEKK polymer has a Td(1%) of at least 490° C., preferably 495° C., more preferably 500° C., as measured by thermal gravimetric analysis according to ASTM D3850, heating from 30° C. to 800° C. under nitrogen using a heating rate of 10° C./min. The invention also relates to a method for producing a PEKK powder for the use in a method for manufacturing a three-dimensional (3D) object, in which:
- the PEKK has a Td(1%) of at least 500° C., preferably 505° C., more preferably 510° C., as measured by thermal gravimetric analysis according to ASTM D3850, heating from 30° C. to 800° C. under nitrogen using a heating rate of 10° C./min,
- the powder has been manufactured by grinding from a coarser powder and has a $d_{0.9}$-value less than 150 μm, as measured by laser scattering in isopropanol.

BACKGROUND ART

Additive manufacturing systems are used to print or otherwise build 3D objects from a digital blueprint created with computer-aided design (CAD) modelling software. Selective laser sintering ("SLS"), one of the available additive manufacturing techniques, uses electromagnetic radiation from a laser to fuse powdered materials into a mass. The laser selectively fuses the powdered material by scanning cross-sections generated from the digital blueprint of the object on the surface of a powder bed. After a cross-section is scanned, the powder bed is lowered by one layer thickness, a new layer of material is applied, and the bed is rescanned. Locally full coalescence of polymer particles in the top powder layer is necessary as well as an adhesion with previous sintered layers. This process is repeated until the object is completed.

In the powder bed of the SLS printer, the powdered material is generally preheated to a processing temperature close to the melting point (Tm) of the resin. The preheating of the powder makes it easier for the laser to raise the temperature of the selected regions of layer of unfused powder to the melting point. The laser causes fusion of the powder only in locations specified by the input. Laser energy exposure is typically selected based on the polymer in use and to avoid polymer degradation.

The potential of the SLS process is limited by the restricted number of materials optimised for the process, notably the lack of identification of a polymeric material which allows obtaining a resulting 3D part with acceptable mechanical properties.

Poly(ether ketone ketone) ("PEKK") polymers are well suited for use in relatively extreme conditions. In part, due to the high crystallinity and high melt temperature of PEKK polymers, they have excellent thermal, physical and mechanical properties.

PEKK polymers are usually prepared by a ketone-forming reaction, in the presence of a Lewis acid, at a temperature ranging from 0 to 120° C. The PEKK polymer produced from this process however presents a major drawback in that it contains a high volatiles (e.g. chlorinated residual solvent) content. This is undesirable for a certain number of applications, for example for the manufacture of 3D objects using a laser-sintering based additive manufacturing system in which the polymer powder stays a long time at a high temperature in the powder bed. Indeed off-gassing of these volatiles during the process leads to the formation of defects in the printed parts.

The problem of the high volatile residual contents could be solved by the addition of post-treatment steps, but this adds to the cost of overall production of the polymer.

There is therefore a need for a PEKK polymeric material to be used in additive manufacturing systems, especially SLS printing methods, which makes possible the manufacture of 3D objects generating the emission of as less as possible of volatiles during the process.

SUMMARY OF INVENTION

The present invention relates to a polymer powder, which can be used in additive manufacturing and other types of rapid prototyping methods, but also for compression molding, and powder coating (i.e. electrostatic or solvent-borne). The powder of the present invention comprises at least a poly(ether ketone ketone) (PEKK) polymer.

According to the present invention, the PEKK polymer has a Td(1%) of at least 500° C., preferably 505° C., more preferably 510° C., as measured by thermal gravimetric analysis according to ASTM D3850, heating from 30° C. to 800° C. under nitrogen using a heating rate of 10° C./min.

According to the present invention, the powder has a $d_{0.9}$-value less than 150 μm, as measured by laser scattering in isopropanol.

The present invention also relates to a method for manufacturing a three-dimensional (3D) object with an additive manufacturing system, such as a powder-based additive manufacturing system, for example Selective Laser Sintering (SLS), Multi Jet Fusion (MJP) or Composite-based Additive Manufacturing Technology (CBAM).

The method for manufacturing a 3D object of the present invention comprises the steps of printing layers of the three-dimensional (3D) object from the part material comprising a PEKK powder as herein defined, preferably by selective sintering of the powder using an electromagnetic radiation.

The 3D objects or articles obtainable by such method of manufacture can be used in a variety of final applications. Mention can be made in particular of implantable device, medical device, dental prostheses, brackets and complex shaped parts in the aerospace industry and under-the-hood parts in the automotive industry.

The expression "part material" hereby refers to the material intended to form the 3D objects or articles, or at least a part of the 3D objects/articles. The part material is according to the present invention used as feedstocks to be used for the manufacture of 3D objects/articles or part of 3D objects/particles. The part material hereby comprises the PEKK powder of the present invention. The part material may notably consist essentially in the PEKK powder of the present invention or it may comprise other components, for example flow agent and additives, as described below.

The method for manufacturing a 3D object of the present invention indeed employs a PEKK polymer powder as the main element of the part material. The powder can have a regular shape such as a spherical shape, or a complex shape obtained by grinding/milling of pellets or coarse powder.

The present invention also relates to a method for the production of a powder comprising at least a poly(ether ketone ketone) (PEKK) polymer, said method comprising a step of polycondensing the monomers in a solvent in order to obtain the PEKK polymer, a step of extracting the solvent and the salts and a step of grinding in order to obtain a powder having a $d_{0.9}$-value less than 150 μm, as measured by laser scattering in isopropanol.

DESCRIPTION OF EMBODIMENTS

The present invention relates to a polymer powder for additive manufacturing. The powder has a $d_{0.9}$-value less than 150 μm, as measured by laser scattering in isopropanol and comprises at least a poly(ether ketone ketone) (PEKK) polymer. The powder of the invention presents a low volatiles content, which makes it well-suited for applications such as the manufacture of 3D objects using a laser-sintering based additive manufacturing system in which the powder has to stay at a high temperature in the powder bed for a long period of time. The volatiles content is defined as the amount of volatiles present in the powder of the invention before use. This amount should be as low as possible in order to limit the off-gazing, that is to say the gradual release of these volatiles when using the powder. Off-gazing can for example take place notably when heating the powder in the powder bed of an SLS printer, such heating sometimes taking several hours, prior to the sintering of the powder.

The volatiles content in the powder of the invention is hereby assessed using thermogravimetry (TGA) according to ASTM D3850 method. The temperature Td at which a determined amount of volatile materials (e.g. 1 wt. % or 2 wt. %) leave the sample is determined by heating progressively the sample from 30° C. to 800° C. under nitrogen using a heating rate of 10° C./min. The temperature Td(1%) is also called the thermal decomposition temperature at 1 wt. %. According to the present invention, Td(1%) should be as high as possible in order to limit the amount of volatiles generated when heating the powder in the powder bed of the SLS printer.

According to the present invention, the PEKK polymer has a Td(1%) of at least 500° C., preferably 505° C., more preferably 510° C., as measured by thermal gravimetric analysis according to ASTM D3850, heating from 30° C. to 800° C. under nitrogen using a heating rate of 10° C./min. This means that the powder retains 99 wt. % or more of its initial weight after being heated to a temperature of 490° C. or above, when measured in accordance with ASTM D3850, heating from 30° C. to 800° C. under nitrogen using a heating rate of 10° C./min.

The PEKK polymer component of the powder of the present invention does advantageously comprise a low volatiles content, in comparison to PEKK polymer described in the prior art or available on the market. This feature makes the PEKK polymer powder well-suited for 3D printing laser sintering method which necessitates heating the powder before sintering. The low volatiles content of the PEKK polymer is obtained by using polymerization conditions such that the polymer remains in solution during the entire polymerization reaction, which avoids encapsulating impurities in the final polymer powder. The polymer also contains reduced levels of reactive metal cations such as aluminum and iron, which can generate volatiles by side-reactions with the polymer.

The present invention also relates to a method for manufacturing a three-dimensional (3D) object (e.g. a 3D model, a 3D article or a 3D part) with an additive manufacturing system, such as a powder-based additive manufacturing (AM) system. Selective Laser Sintering is one example of an AM printing method.

Multi jet fusion ("MJP") is another example of an AM printing method. During multi jet fusion, the entire layer of the powdered material is exposed to radiation, but only a selected region is fused and hardened to become a layer of a 3D object. The MJP method makes use of a fusing agent, which has been selectively deposited in contact with the selected region of the powdered material. The fusing agent is capable of penetrating into the layer of the powdered material and spreading onto the exterior surface of the powdered material. The fusing agent is capable of absorbing radiation and converting the absorbed radiation to thermal energy, which in turn melts or sinters the powdered material that is in contact with the fusing agent. This causes the powdered material to fuse, bind, and cure, in order to form a layer of the 3D object.

Composite-based additive manufacturing technology ("CBAM") is yet another AM printing method to make parts from fiber-reinforced composites, such as carbon, Kevlar and glass fiber fabrics bonded with thermoplastic matrix materials. A liquid is selectively deposited on a fiber substrate layer which is then flooded with powdered material. The powdered material adheres to the liquid and the excess powder is removed. These steps are repeated and the fiber substrate layers are stacked in a predetermined order to create a 3D object. Pressure and heat are applied to the layers of substrate being fused, melting the powdered material and pressing the layers together.

The method for manufacturing a 3D object of the present invention comprises the steps of:
  providing a part material comprising a PEKK powder as herein defined, and
  printing layers of the three-dimensional (3D) object from the part material, preferably by selective sintering of the powder using an electromagnetic radiation.

The method of the present invention is preferably conducted at a temperature where the thermal aging of the PEKK powder/part material, which can be assessed by the polymer aspect (for example color), the coalescence ability and the disaggregation ability, is significantly reduced. In other words, according to this embodiment, the PEKK powder/part material shows no significant signs of thermal aging, can be recycled and use to prepare a new article by laser sintering 3D printing, as such or in combination with neat powdered polymer material.

The 3D objects or articles obtainable by such method of manufacture can be used in a variety of final applications. Mention can be made in particular of implantable device, medical device, dental prostheses, brackets and complex shaped parts in the aerospace industry and under-the-hood parts in the automotive industry.

The expression "part material" hereby refers to the material intended to form at least a part of the 3D object. The part material is according to the present invention used as feedstocks to be used for the manufacture of 3D objects or part of 3D objects.

The method of the present invention indeed employs a PEKK polymer powder as the main element of the part material. The powder can have a regular shape (e.g. spherical shape) or a complex shape for example obtained by grinding/milling of pellets or powder.

In the present application:
any description, even though described in relation to a specific embodiment, is applicable to and interchangeable with other embodiments of the present invention;
where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components; any element or component recited in a list of elements or components may be omitted from such list; and
any recitation herein of numerical ranges by endpoints includes all numbers subsumed within the recited ranges as well as the endpoints of the range and equivalents.

SLS 3D printers are, for example, available from EOS Corporation under the trade name EOSINT® P.

MJF 3D printers are, for example, available from Hewlett-Packard Company under the trade name Jet Fusion.

The powder may also be used to produce continuous fiber composites in a CBAM process, for example as developed by Impossible Objects.

Powder for Additive Manufacturing (AM)

The powder of the present invention comprises at least a poly(ether ketone ketone) (PEKK) polymer, wherein the PEKK polymer comprises at least 50 mol. % of recurring units of formulas (M) and (P), the mol. % being based on the total number of moles in the polymer:

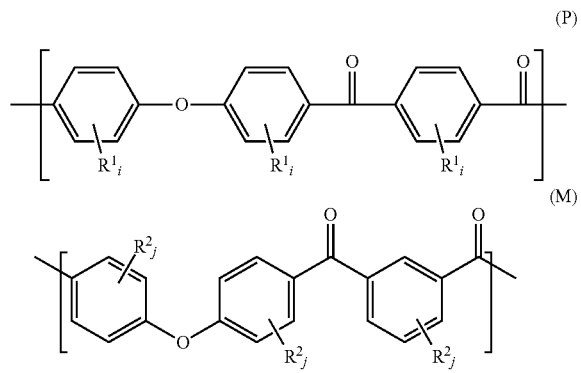

wherein
$R^1$ and $R^2$, at each instance, is independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and
i and j, at each instance, is an independently selected integer ranging from 0 to 4.

According to an embodiment, $R^1$ and $R^2$ are, at each location in formula (P) and (M) above, independently selected from the group consisting of a C1-C12 moiety optionally comprising one or more than one heteroatoms; sulfonic acid and sulfonate groups; phosphonic acid and phosphonate groups; amine and quaternary ammonium groups.

According to another embodiment, i and j are zero for each $R^1$ and $R^2$ group. According to this embodiment, the PEKK polymer comprises at least 50 mol. % of recurring units of formulas (M') and (P'), the mol. % being based on the total number of moles in the polymer:

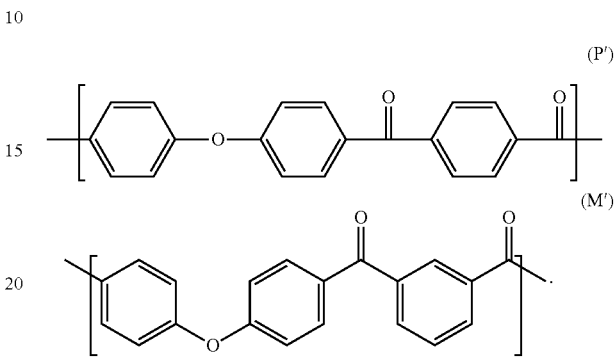

According to an embodiment of the present disclosure, at least 55 mol. %, at least 60 mol. %, at least 70 mol. %, at least 80 mol. %, at least 90 mol. %, at least 95 mol. %, at least 99 mol. % or all of the recurring units in the PEKK are recurring units of formulae (M) and (P).

According to an embodiment of the present disclosure, in the PEKK polymer, the molar ratio of recurring units (P) or/and (P') to recurring units (M) or/and (M') is at least 1:1 to 5.7:1, for example at least 1.2:1 to 4:1, at least 1.4:1 to 3:1 or at least 1.4:1 to 1.86:1.

The PEKK polymer has preferably an inherent viscosity of at least 0.50 dL/g, as measured following ASTM D2857 at 30° C. on 0.5 wt./vol. % solutions in concentrated $H_2SO_4$ (96 wt. % minimum), for example at least 0.60 dL/g or at least 0.65 dL/g and for example at most 1.50 dL/g, at most 1.40 dL/g, or at most 1.30 dL/g.

According to the present invention, the powder has a $d_{0.9}$-value less than 150 μm, as measured by laser scattering in isopropanol. According to an embodiment, the powder has a $d_{0.9}$-value less than 120 μm, as measured by laser scattering in isopropanol, preferably less than 100 μm or less 90 μm.

According to an embodiment of the present invention, the powder has a $d_{0.5}$-value comprised between 30 and 90 μm, as measured by laser scattering in isopropanol, preferably between 35 and 80 μm, or between 38 and 70 μm or between 40 and 60 μm.

The powder of the present invention may have a BET surface area ranging from 0.1 to 5 m²/g, preferably from 0.2 to 4 m²/g, as measured by ISO 9277, using a soak/evacuation temperature of at most 25° C.

According to an embodiment of the present disclosure, the powder has a Tm ranging from 270 and 360° C., preferably from 280 and 315° C., as measured by differential scanning calorimetry (DSC) according to ASTM D3418.

According to another embodiment of the present disclosure, the powder has a Tg ranging from 140 and 170° C., preferably from 145 and 165° C., as measured by differential scanning calorimetry (DSC) according to ASTM D3418.

According to a preferred embodiment of the present disclosure, the powder has a bulk density ρB of at least 0.40, preferably at least 0.41, most preferably at least 0.42.

Optional Components

The powder or powder mixtures of the present invention may further comprise a flow agent (F). This flow agent (F) may for example be hydrophilic. Examples of hydrophilic flow aids are inorganic pigments notably selected from the group consisting of silicas, aluminas and titanium oxide. Mention can be made of fumed silica.

Fumed silicas are commercially available under the trade name Aerosil® (Evonik) and Cab-O-Sil© (Cabot).

According to an embodiment of the present invention, the powder comprises from 0.01 to 10 wt. % of a flow agent (F), for example from 0.05 to 8 wt. %, from 0.1 to 6 wt. % or from 0.15 to 5 wt. % of at least one flow agent (F), for example of at least fumed silica.

These silicas are composed of nanometric primary particles (typically between 5 and 50 nm for fumed silicas). These primary particles are combined to form aggregates. In use as flow agent, silicas are found in various forms (elementary particles and aggregates).

The powder or powder mixtures of the present invention may further comprise at least another polymeric material. This additional polymeric material may for example be selected from the group consisting of poly(aryl ether sulfone) (PAES) polymers, for example a poly(biphenyl ether sulfone) (PPSU) polymer and/or a polysulfone (PSU) polymer, a poly(aryl ether ketone) (PAEK) polymers, for example a poly(ether ether ketone) (PEEK) polymer.

The powders or powder mixtures of the present invention may further comprise one or several additives (A), such as lubricants, heat stabilizers, light stabilizers, antioxidants, pigments, processing aids, dyes, fillers, nanofillers or electromagnetic absorbers. Examples of these optional additives are titanium dioxide, zinc oxide, cerium oxide, silica or zinc sulphide, glass fibers, carbon fibers.

The powders or powder mixtures of the present invention may further comprise flame retardants such as halogen and halogen free flame retardants.

According to one embodiment, the part material used in the method of the present invention comprises:
  at least 50 wt. % of the PEKK powder described above,
  from 0.01 wt. % to 10 wt. %, from 0.05 to 8 wt. %, from 0.1 to 6 wt. % or from 0.15 to 5 wt. % of at least one flow agent (F), and
  optionally at least one additive (A), for example selected from the group consisting of fillers (such as milled carbon fibers, silica beads, talc, calcium carbonates) colorants, dyes, pigments, lubricants, plasticizers, flame retardants (such as halogen and halogen free flame retardants), nucleating agents, heat stabilizers, light stabilizers, antioxidants, processing aids, fusing agents and electromagnetic absorbers, based on the total weight of the part material.

According to one embodiment, the part material used in the method of the present invention comprises at least 60 wt. % of the PEKK powder, for example at least 70 wt. %, at least 80 wt. %, at least 90 wt. %, at least 95 wt. %, at least 98 wt. % or at least 99 wt. % of the PEKK powder described herein.

According to another embodiment, the part material used in the method of the present invention consists essentially in the PEKK powder described herein.

Method for Manufacturing a 3D Object

The present invention also relates to a method for manufacturing a three-dimensional (3D) object with an additive manufacturing system which comprises the step of printing layers of the 3D object/article/part from a part material comprising the PEKK powder described herein.

According to an embodiment, the process comprises at least two steps:
  the provision of a part material comprising a powder as described herein, and
  a step consisting in printing layers of the three-dimensional (3D) object from the part material.

According to an embodiment, the step of printing layers comprises the selective sintering of the PEKK powder by means of an electromagnetic radiation of the PEKK powder, for example a high power laser source such as an electromagnetic beam source.

The 3D object/article/part may be built on substrate, for example an horizontal substrate and/or on a planar substrate. The substrate may be moveable in all directions, for example in the horizontal or vertical direction. During the 3D printing process, the substrate can, for example, be lowered, in order for the successive layer of unsintered polymeric material to be sintered on top of the former layer of sintered polymeric material.

According to an embodiment, the process further comprises a step consisting in producing a support structure. According to this embodiment, the 3D object/article/part is built upon the support structure and both the support structure and the 3D object/article/part are produced using the same AM method. The support structure may be useful in multiple situations. For example, the support structure may be useful in providing sufficient support to the printed or under-printing, 3D object/article/part, in order to avoid distortion of the shape 3D object/article/part, especially when this 3D object/article/part is not planar. This is particularly true when the temperature used to maintain the printed or under-printing, 3D object/article/part is below the re-solidification temperature of the PEKK powder.

The method of manufacture usually takes place using a printer. The printer may comprise a sintering chamber and a powder bed, both maintained at determined at specific temperatures.

The powder to be printed can be pre-heated to a processing temperature (Tp), above the glass transition (Tg) temperature of the powder. The preheating of the powder makes it easier for the laser to raise the temperature of the selected regions of layer of unfused powder to the melting point. The laser causes fusion of the powder only in locations specified by the input. Laser energy exposure is typically selected based on the polymer in use and to avoid polymer degradation.

In some embodiments, the powder to be printed is preheated to a temperature Tp, which is well-below the melting point (Tm) or the crystallisation point (Tc) of the PEKK powder, for example to a processing temperature Tp (expressed in ° C.) which is less than Tg+80, for example less than Tg+70, less than Tg+60, less than Tg+50 or less than Tg+40. According to this embodiment, the processing temperature is precisely adjusted between in a temperature sintering window, which notably makes possible the recycling of the unsintered material and its reuse in the manufacture of a new 3D object/article/part. According to these embodiments, the powder is not significantly affected by the long-term exposure to the processing temperature and presents a set of characteristics (namely powder aspect and color, disaggregation and coalescence abilities) which is comparable to a new, unprocessed polymer material. This makes the used powder completely suitable for reuse in a laser sintering 3D printing process, without impacting the appearance and mechanical performances of the resulting printed article (notably the expected performance of the polymer materials).

Method for Producing a PEKK Powder

The present invention relates to a method for producing a PEKK powder for the use in a method for manufacturing a 3D object, in which:
- the PEKK has a Td(1%) of at least 500° C., preferably 505° C., more preferably 510° C., as measured by thermal gravimetric analysis according to ASTM D3850, heating from 30° C. to 800° C. under nitrogen using a heating rate of 10° C./min,
- the powder has been manufactured by grinding from a coarser powder and has a $d_{0.9}$-value less than 150 μm, as measured by laser scattering in isopropanol.

The present invention also relates to a method for the production of a powder comprising at least one poly(ether ketone ketone) (PEKK) polymer, said method comprising a step of polycondensing the monomers in a solvent in order to obtain the PEKK polymer, a step of extracting the solvent and the salts and a step of grinding in order to obtain a powder having a $d_{0.9}$-value less than 150 μm, as measured by laser scattering in isopropanol.

According to an embodiment, the polycondensation of the monomers does not take place in the presence of a Lewis acid or takes place in the presence of an amount of Lewis acid of less than 2 wt. %, based on the total weight of the monomers, preferably less than 1 wt. %, more preferably less than 0.5 wt. %.

The present invention also relates to a method for the production of a powder comprising at least a poly(ether ketone ketone) (PEKK) polymer comprising at least 50 mol. % of recurring units of formulas (M) and (P), the mol. % being based on the total number of moles in the polymer:

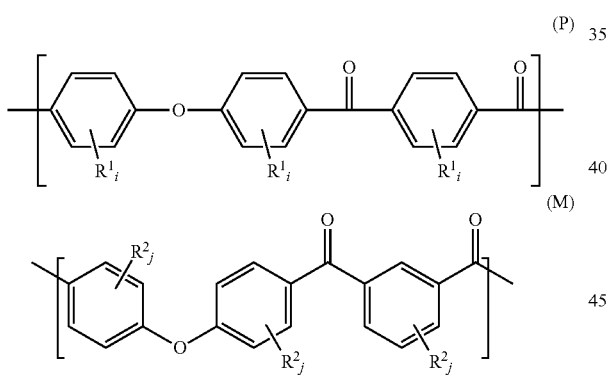

(P)

(M)

wherein
- $R^1$ and $R^2$, at each instance, is independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and
- i and j, at each instance, is an independently selected integer ranging from 0 to 4, said method comprising:
- the preparation of a PEKK polymer in a solvent in the absence of a Lewis acid or in the presence of an amount of Lewis acid of less than 2 wt. %, based on the total weight of the monomers, preferably less than 1 wt. %, more preferably less than 0.5 wt. %,
- the extraction of the salts and the solvent, in order to obtain a powder,
- the grinding of the powder, in order to obtain a powder having a $d_{0.9}$-value less than 150 μm, as measured by laser scattering in isopropanol.

In the context of the present invention, the Lewis acid may be dined as selected in the group consisting of $BF_3$, $AlCl_3$, $FeCl_3$, $CF_3SO_3H$ and $CH_3SO_3H$.

According to an embodiment, the method for the production of a powder comprising at least a poly(ether ketone ketone) (PEKK) polymer, comprises:
Step a) polycondensing monomers (P—OH), (M-OH), (P—F) and/or (M-F), in a solvent:

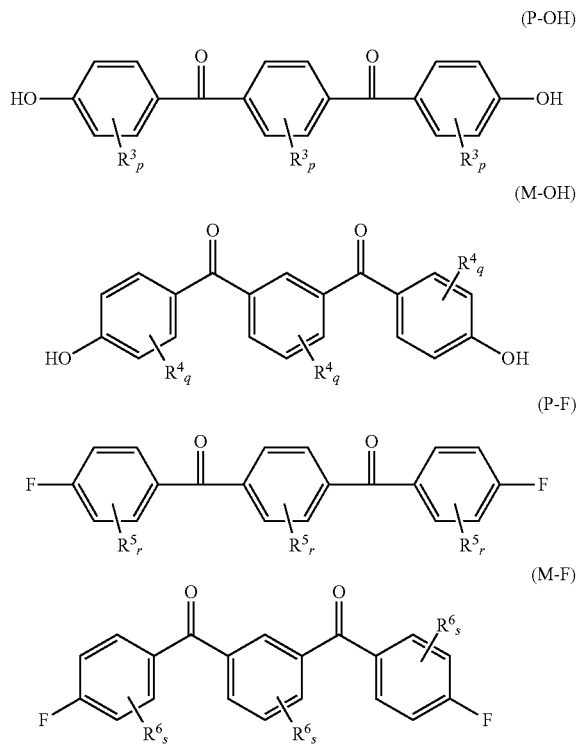

(P-OH)

(M-OH)

(P-F)

(M-F)

wherein
- $R^3$, $R^4$, $R^5$ and $R^6$, at each instance, is independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium;
- p, q, r and s, at each instance, is an independently selected integer ranging from 0 to 4;

wherein the molar ratio of moles of (P—OH) and (M-OH) to moles of (P—F) and (M-F) is such that:

$$0.90 \leq \frac{n_{(P-OH)} + n_{(M-OH)}}{n_{(P-F)} + n_{(M-F)}} \leq 1.10$$

Step b) extracting the solvent and the salts, in order to obtain a powder; and
Step c) grinding the powder of step b), in order to obtain a powder having a $d_{0.9}$-value less than 150 μm, as measured by laser scattering in isopropanol.

The method described herein produces a PEKK powder having a low volatiles content and a particle size distribution ($d_{0.9}$ and $d_{0.5}$) which make it well suited for laser-sintering based additive manufacturing or other types of rapid prototyping methods, for compression molding, electrostatic or solvent-borne powder coating. According to a preferred embodiment, the powder has present a having a bulk density ρB of at least 0.40, preferably at least 0.41, most preferably at least 0.42.

According to an embodiment, $R^3$, $R^4$, $R^5$ and $R^6$ are, at each location in formula (P—OH), (P—F), (M-OH) and (M-F) above, independently selected from the group consisting of a C1-C12 moiety optionally comprising one or more than one heteroatoms; sulfonic acid and sulfonate groups; phosphonic acid and phosphonate groups; amine and quaternary ammonium groups.

According to another embodiment, p, q, r and s are zero for each $R^3$, $R^4$, $R^5$ and $R^6$ group. According to this embodiment, Step a) consists in polycondensing monomers (P'—OH), (M'-OH), (P'—F) and/or (M'-F), in a solvent:

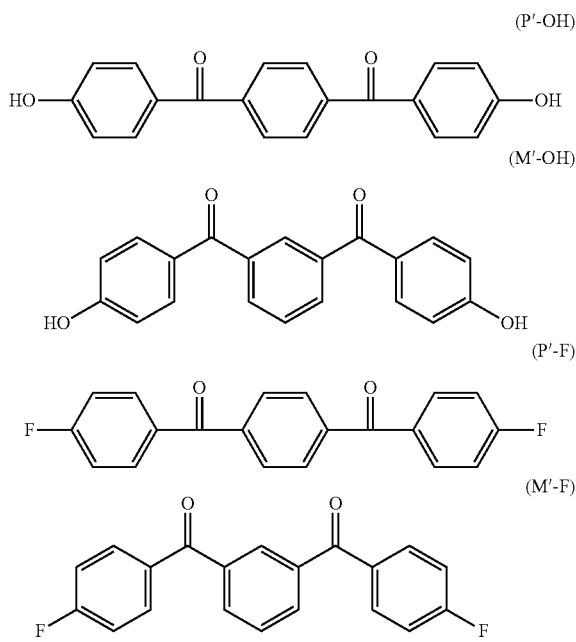

The molar ratio of moles of (P—OH) and (M-OH) to moles of (P—F) and (M-F) is such that:

$$0.90 \le \frac{n_{(P-OH)} + n_{(M-OH)}}{n_{(P-F)} + n_{(M-F)}} \le 1.10,$$

$$\text{preferably } 0.95 \le \frac{n_{(P-OH)} + n_{(M-OH)}}{n_{(P-F)} + n_{(M-F)}} \le 1.05,$$

$$\text{more preferably } 0.98 \le \frac{n_{(P-OH)} + n_{(M-OH)}}{n_{(P-F)} + n_{(M-F)}} \le 1.02,$$

$$\text{even more preferably } 0.985 \le \frac{n_{(P-OH)} + n_{(M-OH)}}{n_{(P-F)} + n_{(M-F)}} \le 1.00.$$

According to a specific embodiment of the present invention, Step a) comprises:
Step a1) heating the reaction mixture to a first temperature of from 180 to 320° C.;
Step a2) placing monomers (P—OH) and (M-OH), optionally monomers (P—F) and/or (M-F), in contact in a solvent;
Step a3) heating the reaction mixture to a second temperature of from 300 to 340° C.; and
wherein at least one base is added during the process, for example during step a2).

According to a specific embodiment of the present invention, Step a) comprises:
Step a1) placing monomers (P—OH) and (M-OH), optionally monomers (P—F) and/or (M-F), in contact in a solvent;
Step a2) heating the reaction mixture to a first temperature of from 180 to 320° C.;
Step a3) heating the reaction mixture to a second temperature of from 300 to 340° C.; and
wherein at least one base is added to step a1) and/or between steps a2) and a3).

According to another specific embodiment of the present invention, the method comprises:
Step a1) placing monomers (P—OH) and (M-OH), in contact in a solvent with at least one base;
Step a2) heating the reaction mixture to a first temperature of from 180 to 320° C.;
Step a2') adding monomers (P—F) and/or (M-F) to the reaction mixture;
Step a3) heating the reaction mixture to a second temperature of from 300 to 340° C.;
Step b) extracting the solvent and the salts, in order to obtain a powder;
Step c) grinding the powder of step b).

According to another embodiment of the present invention, the method comprises:
Step a1) placing monomers (P—OH), (M-OH) and (P—F), in contact in a solvent;
Step a2) heating the reaction mixture to a first temperature of from 180 to 320° C.;
Step a2') adding at least one base to the reaction mixture;
Step a3) heating the reaction mixture to a second temperature of from 300 to 340° C.;
Step b) extracting the solvent and the salts, in order to obtain a powder; and
Step c) grinding the powder of step b).

In all the embodiments above-mentioned, the step of placing the monomers and the step of heating the reaction to a first temperature of from 180 to 320° C. can take place simultaneously.

According to another embodiment of the present invention, the method is such that monomers (P—F) and/or (M-F) are subsequently added after step a), a2) or a3). This optional step allows the control of the molecular weight of the PEKK polymer by terminating the polycondensation reaction. In this embodiment, the amount of (P—F) and/or (M-F) added after step a), a2) or a3) is less than 10 mol. % of amount of (P—F) and/or (M-F) used in step a), preferably less than 7 mol. %, more preferably less than 5 mol. %.

According to another embodiment of the present invention, the method further comprises a step consisting in adding a flow agent to the powder after step b) and/or after step c).

According to another embodiment of the present invention, the method further comprises a step consisting in cooling the powder of step b) to a temperature below 25° C. before step c), for example below 0° C.

Step a)—Polycondensation

The polycondensation reaction takes place in a solvent. The solvent can include, but is not limited to, diphenyl sulfone, dibenzothiophene dioxide, benzophenone or combinations of any one or more thereof. Preferably, the solvent includes diphenyl sulfone. More preferably, the solvent includes at least 90 wt. %, at least 95 wt. %, at least 98 wt. % or at least 99 wt. % diphenyl sulfone. In some embodiments, the diphenyl sulfone used in the synthesis method described herein includes limited amounts of impurities, as detailed in U.S. Pat. No. 9,133,111, filed Apr. 7, 2014 and incorporated herein by reference.

The weight ratio of monomers to solvent used in steps a) can be such that:

$$0.34 \leq \frac{m_{(P-F)} + m_{(M-F)} + m_{(M-OH)} + m_{(P-OH)}}{m_{(P-F)} + m_{(M-F)} + m_{(M-OH)} + m_{(P-OH)} + m_{(solvent)}} \leq 0.48 \text{ or}$$

$$0.35 \leq \frac{m_{(P-F)} + m_{(M-F)} + m_{(M-OH)} + m_{(P-OH)}}{m_{(P-F)} + m_{(M-F)} + m_{(M-OH)} + m_{(P-OH)} + m_{(solvent)}} \leq 0.46$$

wherein m designates the weight of each component used in the method.

The base(s) used in step a) may comprise an alkali metal carbonate and/or alkali metal bicarbonate, for example sodium carbonate, potassium carbonate, sodium bicarbonate and/or potassium bicarbonate. Preferably, the base(s) used in step a) are sodium carbonate and/or potassium carbonate. Most preferably, a mixture of sodium carbonate and potassium carbonate is used in step a). Preferably, sodium carbonate used in step a) meets the particle size distribution requirements as detailed in U.S. Pat. No. 9,175,136, filed Oct. 23, 2009 and incorporated herein by reference.

The polycondensation step may comprise at least one step consisting in heating the reaction mixture to a first temperature of from 180 to 320° C., for example from 185 to 310° C. or from 190 to 305° C.

The polycondensation step may also comprise a second step consisting in heating the reaction mixture to a second temperature of from 300 to 340° C., for example from 305 to 335° C. or from 310 to 330° C.

Step b)—Extraction of the Salts and the Solvent

According to step b) of the process the PEKK polymer is recovered by filtration of the salts, washing and optionally drying of the powder. Acetone and water may for example be used to extract the salts and the solvent.

Step c)—Grinding

According to step c), the powder obtained from the polycondensation reaction and the extraction of salts and solvent, for example having a $d_{0.9}$-value between 500 and 4000 µm and/or a $d_{0.5}$-value between 200 and 2000 µm, called herein "coarse powder", is ground to produce the powder of the present invention, having a $d_{0.9}$ of less than 150 µm.

The coarse granulate can for example be ground in a pinned disk mill, a jet mill/fluidized jet mil with classifier, an impact mill plus classifier, a pin/pin-beater mill or a wet grinding mill, or a combination of those equipment.

The coarse powder can be cooled before step c) to a temperature below the temperature at which the material becomes brittle, for example below 25° C. before being ground.

The step of grinding can also take place with additional cooling. Cooling can take place by means of liquid nitrogen or dry ice.

The ground powder can be separated, preferably in an air separator or classifier, to obtain a predetermined fraction spectrum.

Optional Additional Steps

According to an embodiment, the method further comprises, after step c), a step consisting in exposing the powder to a temperature (Ta) ranging from the glass transition temperature (Tg) of the PEKK polymer and the melting temperature (Tm) of the PEKK polymer, both Tg and Tm being measured using differential scanning calorimetry (DSC) according to ASTM D3418. The temperature Ta can be selected to be at least 20° C. above the Tg of the PEKK polymer, for example at least 30, 40 or 50° C. above the Tg of the PEKK polymer. The temperature Ta can be selected to be at least 5° C. below the Tm of the PEKK polymer, for example at least 10, 20 or 30° C. below the Tm of the PEKK polymer. The exposition of the powder to the temperature Ta can for example be by heat-treatment and can take place in an oven (static, continuous, batch, convection), fluid bed heaters. The exposition of the powder to the temperature Ta can alternatively be by irradiation with electromagnetic or particle radiation. The heat treatment can be conducted under air or under inert atmosphere. Preferably, the heat treatment is conducted under inert atmosphere, more preferably under an atmosphere containing less than 2% oxygen.

According to an embodiment, the method further comprises, after step c), a step consisting in exposing the powder to a mechanical treatment, using for example a mixer. At a smaller scale, a household Krupps coffee mill can be used.

The present invention also relates to the powder obtainable by the process described above.

Applications

The powder of the present invention can be used in SLS 3D printing or other rapid prototyping method (for example Airbus® ThermoMelt®, MJF or CBAM), in compression molding or in electrostatic or solvent-borne powder coating.

The present invention also therefore relates to the use of the powder for the manufacture of three-dimensional (3D) objects/articles/parts using a laser-sintering additive manufacturing system or in other words, to a method of using the powder for the manufacture of three-dimensional objects using a laser-sintering additive manufacturing system.

Should the disclosure of any patents, patent applications, and publications which are incorporated herein by reference conflict with the description of the present application to the extent that it may render a term unclear, the present description shall take precedence.

EXAMPLES

Example 1

Raw Materials 1,2-dichlorobenzene, terephthaloyl chloride, isophthaloyl chloride, 3,5-dichlorobenzoylchloride, aluminum chloride (AlCl$_3$), methanol were purchased from Sigma Aldrich.

1,4-Bis(4-phenoxybenzoyl)benzene was prepared according to IN patent 193687 (filed on Jun. 21, 1999 and incorporated herein by reference).

1,4-bis(4'-FB)B: 1,4-bis(4'-fluorobenzoyl)benzene was prepared by Friedel-Crafts acylation of fluorobenzene according to Example 1 of U.S. Pat. No. 5,300,693 to Gilb et al. (filed Nov. 25, 1992 and incorporated herein by reference), purified by recrystallization in chlorobenzene to reach a GC purity of 99.9%.

1,3-bis(4'-FB)B: 1,3-bis(4'-fluorobenzoyl)benzene was procured from 3B Corp, USA and purified by recrystallization in chlorobenzene to reach a GC purity of 99.9%.

1,4-bis(4'-HB)B and 1,4-bis(4'-HB)B: 1,4-bis(4'-hydroxybenzoyl)benzene and 1,3-bis(4'-hydroxybenzoyl)benzene were respectively produced by hydrolysis of 1,4-bis (4'-fluorobenzoyl)benzene and 1,3-bis(4'-fluorobenzoyl) benzene, respectively following the procedure described in Example 1 of U.S. Pat. No. 5,250,738 to Hackenbruch et al.

(filed Feb. 24, 1992 and incorporated herein by reference) and purified by recrystallization in DMF/ethanol to reach a GC purity of 99.0%.

DPS: Diphenyl sulfone (polymer grade) was commercial obtained from Proviron (99.8% pure).

$Na_2CO_3$: sodium carbonate, light soda ash sold under the trade name Soda Solvay® L and commercially obtained from Solvay S. A. The sodium carbonate had a $d_{0.9}$<150 μm and was dried before use.

$K_2CO_3$: potassium carbonate ($d_{0.9}$<45 μm), commercially obtained from Armand Products Company (USA). The potassium carbonate was dried before use.

LiCl: Lithium chloride (anhydrous powder) commercially obtained from Acros Organics (Geel, Belgium).

PEKK Preparation

Comparative PEKK #1 (Comparative Example)

This example demonstrates the synthesis of a PEKK using a preparation process in the presence of a Lewis acid and the preparation of the fine powder therefrom.

Polycondensation

In a 200 mL 4-neck reaction flask fitted with a stirrer, a dry $N_2$ inlet tube, a thermocouple plunging in the reaction medium, and a condenser were introduced 1000 g 1,2-dichlorobenzene and 40.63 g 1,4-Bis(4-phenoxybenzoyl) benzene. Under a sweep of dry nitrogen, 3.375 g of terephthaloyl chloride, 13.880 g of isophthaloyl chloride and 0.354 g of 3,5-dichlorobenzoyl chloride were then added to the reaction mixture. The reactor was then cooled to −5° C. and 71.88 g of aluminum chloride ($AlCl_3$) were added slowly while keeping the temperature below 5° C. The reaction was held at 5° C. for 10 minutes then the temperature of the mixture was increased to 90° C. at 5° C./minute. The reaction mixture was held at 90° C. for 30 minutes then cooled down to 30° C. At 30° C., 250 g of methanol were added slowly to maintain the temperature below 60° C. After the end of the addition, the reaction mixture was kept under agitation for 2 hours then cooled down to 30° C.

Filtration and Washing

The solid was then removed by filtration on a Büchner. The wet cake was rinsed on the filter with an additional 188 g of methanol. The wet cake was then reslurried in a beaker with 440 g of methanol for 2 hours. The polymer solid was filtered again on Büchner funnel and the wet cake was rinsed on the filter with 188 g of methanol. The solid was slurried with 470 g of an aqueous hydrochloric acid solution (3.5 wt %) for 2 hours. The solid was then removed by filtration on a Büchner. The wet cake was rinsed on the filter with an additional 280 g of water. The wet cake was then reslurried in a beaker with 250 g of 0.5N sodium hydroxide aqueous solution for 2 hours. The wet cake was then reslurried in a beaker with 475 g of water and filtered on Büchner funnel. The last water washing step was repeated 3 more times. The polymer reactor powder was the dried in a vacuum oven at 180° C. for 12 hours.

Grinding

A well-mixed blend of PEKK #1 (one portion) and crushed dry ice (two portions) was slowly fed to the feed port of a Retsch SR300 rotor mill, fitted with a 0.5 mm opening Conidur screen mounted in the reverse flow position and standard 6-blade rotor with a speed of 10,000 rpm.

The material was re-blended with crushed dry ice at 1 part resin and 2 parts dry ice to the Retsch SR300 with a 0.08 mm screen, also in the reverse flow position with a standard 6-blade rotor at 10,000 rpm.

Once all the material had been ground through the 0.08 mm grinding screen, it was vacuum oven dried at 120° C. for about 16 hours.

The powder presents a $d_{0.9}$-value of 121.9 μm and $d_{0.5}$-value of 63.85 μm.

PEKK #2 (Inventive Example)

This example demonstrates the synthesis of a PEKK using a preparation process in which no Lewis acid is used and the preparation of the fine powder therefrom.

Polycondensation

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 127.82 g of DPS, 31.829 g of 1,3-bis(4'-HB)B, 7.957 g of 1,4-bis(4'-HB)B, 14.110 g of $Na_2CO_3$ and 0.078 g of $K_2CO_3$.

The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 200° C. At 200° C., 40.606 g of 1,4-bis(4'-FB)B was added via a powder dispenser to the reaction mixture over 30 minutes. At the end of the addition, the reaction mixture was heated to 320° C. at 1° C./minute. After 170 minutes at 320° C., 0.403 g of 1,4-bis(4'-FB)B were added to the reaction mixture while keeping a nitrogen purge on the reactor. After 5 minutes, 0.530 g of LiCl were added to the reaction mixture. 10 minutes later, another 0.101 g of 1,4-bis(4'-FB)B were added to the reactor and the reaction mixture was kept at temperature for 15 minutes.

Extraction

The reactor content was then poured from the reactor into a SS pan and cooled. The solid was broken up and ground in an attrition mill through a 2 mm screen. DPS and salts were extracted from the mixture with acetone and water at pH between 1 and 12. The powder was then removed from the reactor and dried at 120° C. under vacuum for 12 hours yielding 72 g of an off-white/yellow powder. The final polymer had a T/I ratio of 60/40. The powder presents a $d_{0.9}$-value of 1605 μm and $d_{0.5}$-value of 710 μm.

Grinding

A well-mixed blend of PEKK #2 (one portion) and crushed dry ice (two portions) was slowly fed to the feed port of a Retsch ZM200 rotor mill, fitted with a 0.5 mm opening Conidur screen and standard 6-blade rotor with a speed of 10,000 rpm. The ground material was vacuum oven dried at 100° C. for 16 hours.

This process was continued using screens with the following opening sizes; 0.25 mm, 0.12 mm and finally a 0.08 mm.

The powder presents a $d_{0.9}$-value of 105.7 μm and $d_{0.5}$-value of 60.1 μm.

PEKK #3 (Inventive Example)

This example demonstrates the synthesis of a PEKK using a preparation process in which no Lewis acid is used and the preparation of the fine powder therefrom.

Polycondensation

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 127.82 g of DPS, 36.129 g of 1,3-bis(4'-HB)B, 9.032 g of 1,4-bis(4'-HB)B, and 46.365 g of 1,4-bis(4'-FB)B.

The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 200° C. At 200° C., 15.609 g of $Na_2CO_3$ and 0.098 g of $K_2CO_3$ was added via a powder dispenser to the reaction mixture over 60 minutes. At the end of the addition, the reaction mixture was heated to 320° C. at 1° C./minute. After 163 minutes at 320° C., 0.914 g of 1,4-bis(4'-fluorobenzoyl)benzene were added to the reaction mixture while keeping a nitrogen purge on the reactor. After 5 minutes, 0.601 g of LiCl were added to the reaction mixture. 10 minutes later, another 0.457 g of 1,4-bis(4'-FB)B were added to the reactor and the reaction mixture was kept at temperature for 15 minutes.

Extraction

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 81 g of an off-white/yellow powder. The polymer has a T/I ratio of 60/40. The powder presents a $d_{0.9}$-value of 1425 μm and $d_{0.5}$-value of 650 μm.

Grinding

A well-mixed blend of PEKK #3 (one portion) and crushed dry ice (two portions) was slowly fed to the feed port of a Retsch SR300 rotor mill, fitted with a 0.5 mm opening Conidur screen mounted in the reverse flow position and standard 6-blade rotor with a speed of 10,000 rpm.

The material was re-blended with crushed dry ice at 1 part resin and 2 parts dry ice to the Retsch SR300 with a 0.08 mm screen, also in the reverse flow position with a standard 6-blade rotor at 10,000 rpm.

Once all the material had been ground through the 0.08 mm grinding screen, it was vacuum oven dried at 120° C. for about 16 hours.

The powder presents a $d_{0.9}$-value of 112.9 μm and $d_{0.5}$-value of 64.46 μm.

Testing

Thermal Decomposition Temperatures (Td)

The thermal decomposition temperature at 1 wt. % loss, Td (1%), was measured by thermal gravimetric analysis ("TGA") according to the ASTM D3850. TGA was performed on a TA Instruments TGA Q500 from 30° C. to 800° C. under nitrogen (60 mL/min) at a heating rate of 10° C./minute.

Thermal Transitions (Tg, Tm)

The glass transition and melting temperatures of the polymers were measured using differential scanning calorimetry (DSC) according to ASTM D3418 employing a heating and cooling rate of 10° C./min. Three scans were used for each DSC test: a first heat up to 360° C. followed by a first cool down to 30° C., followed by a second heat up to 360° C. The Tg and the Tm were determined from the second heat up. DSC was performed on a TA Instruments DSC Q20 with nitrogen as carrier gas (99.998% purity, 50 mL/min).

Melt Flow Index (MFI)

MFI was measured using ASTM D1238 at 340° C. with a 8.4 kg weight with a 6 minute-dwell time.

Inherent Viscosity (IV)

IV was measured following ASTM D2857 at 30° C. on 0.5 wt./vol. % solutions in concentrated $H_2SO_4$ (96 wt. % minimum) using a Cannon—Fenske capillary, size 200.

PSD ($d_{0.9}$, $d_{0.5}$)

The PSD (volume distribution) was determined by an average of 3 runs using laser scattering Microtrac S3500 analyzer in wet mode (128 channels, between 0.0215 and 1408 μm). The solvent was isopropanol with a refractive index of 1.38 and the particles were assumed to have a refractive index of 1.59. The ultrasonic mode was enabled (25 W/60 seconds) and the flow was set at 55%.

BET Surface Area

The porosity of the powders was measured according to ISO9277 using a soak/evacuation temperature of 25° C.

Bulk Density (ρB)

Bulk density was determined by adding ground polymer to a tared 100 mL graduated cylinder to about 90-95 mL and allowing the material to settle naturally. The volume was read and the cylinder reweighed. The bulk density was determined by the following formula:

$$\rho B = \text{mass/volume}$$

Results

TABLE 1

|  | PEKK#1 (comp) | PEKK#2 (inv) | PEKK#3 (inv) |
|---|---|---|---|
| Td(1%) (° C.) | 461.1 | 532.8 | 521.04 |
| Tm (° C.) | 282 | 304 | 312 |
| Tg (° C.) | 152 | 149 | 159 |
| IV (dL/g) | 1.07 | 0.94 | 0.87 |
| MFI (g/10 min) | 33 | 26 | 43 |
| BET (m²/g) | 10.151 | 1.006 | 0.527 |
| Bulk density | 0.39 | 0.46 | 0.46 |

The PEKK powders #2 and #3 (according to the invention) exhibit:

A much lower level of residual volatiles as the higher Td(1%) indicates as compared to the comparative PEKK #1 powder, A lower porosity as shown by a lower BET surface area, which improves the flowability and the stability of the powder, and A higher bulk density, which improves the packing of the powder bed when for example used in a SLS 3D printing process.

Example 2

Raw Materials

PEKK #1, PEKK #2 and PEKK #3 from example 1

Flow agent: Cab-O-Sil© M-5 commercially available from Cabot.

Mixing with the Flow Agent

To a 250 mL beaker were added 100.0 g of PEKK #1, PEKK #2 or PEKK #3, and 0.20 g of the flow agent.

The mixture was stirred for 2 minutes and then poured into a Krups Model F2034251 Coffee Mill and blended for 30 seconds, then again for an additional 30 seconds.

Results

TABLE 2

|  | PEKK#1 (comp) + flow agent | PEKK#2 (inv) + flow agent | PEKK#3 (inv) + flow agent |
|---|---|---|---|
| Td(1%) (° C.) | 426.7 | 516.5 | 507.4 |
| BET (m²/g) | 10.151 | 1.006 | 0.527 |
| Bulk density | 0.37 | 0.46 | 0.46 |

The powder of the invention (PEKK #2 and PEKK #3), further comprising 0.2 wt. % of a flow agent, still exhibit:
a lower level of residual volatiles,
a lower porosity, and
a higher bulk density.

Example 3

Comparative PEKK #4 (Comparative Example)

This example demonstrates the preparation of PEKK fine powder from a sample of commercial Kepstan™ 6004 PEKK pellets.

Kepstan™ 6004 pellets were obtained from Arkema.
Grinding
PEKK pellets were slowly fed to the feed port of a Retsch SR200 rotor mill, fitted with a 0.5 mm opening Conidur screen mounted in the reverse flow position and standard 6-blade rotor with a speed of 10,000 rpm.

The material was then re-fed to the Retsch SR200 with a 0.08 mm screen, also in the reverse flow position with a standard 6-blade rotor at 10,000 rpm.

Once all the material had been ground through the 0.08 mm grinding screen, it was vacuum oven dried at 120° C. for about 16 hours.

The powder presents a $d_{0.9}$-value of 150 μm and $d_{0.5}$-value of 80 μm.

The powder was analysed by TGA for Td(1%) (as described in Example 1 above). Results are presented in Table 3 below.

Example 4

Comparative PEKK #5 (Comparative Example)

This example demonstrates the synthesis of a PEKK using a preparation process in the presence of a Lewis acid according to example 5 of patent application US 2015/183918 and the preparation of the fine powder therefrom.
Polycondensation
In a 2000 mL 4-neck reaction flask fitted with a stirrer, a dry $N_2$ inlet tube, a thermocouple plunging in the reaction medium, and a condenser were introduced 1600 g 1,2-dichlorobenzene and 65.00 g 1,4-Bis(4-phenoxybenzoyl)benzene. Under a sweep of dry nitrogen, 5.400 g of terephthaloyl chloride, 22.200 g of isophthaloyl chloride and 0.38 g of benzoyl chloride were then added to the reaction mixture. The reactor was then cooled to −5° C. and 115.00 g of aluminum chloride ($AlCl_3$) were added slowly while keeping the temperature below 5° C. The reaction was held at 5° C. for 10 minutes then the temperature of the mixture was increased to 90° C. at 1.5° C./minute. The reaction mixture was held at 90° C. for 30 minutes then cooled down to 30° C. At 30° C., 400 g of an aqueous 3% HCl solution were added slowly to maintain the temperature below 60° C. After the end of the addition, the reaction mixture was kept under agitation for 2 hours then cooled down to 30° C.
Filtration and Washing
The solid was then removed by filtration on a Büchner. The wet cake was then introduced, along with 800 g of deionized water in a 2000 L 4-neck reaction flask fitted with a stirrer, a dry $N_2$ inlet tube, a thermocouple plunging in the reaction medium, and a Dean-Stark trap with a condenser. The slurry was heated up to 98° C. and approximately 600 g of liquid were collected in the Dean-Stark receiver. The mixture was cooled to down to room temperature and filtered on Büchner. The wet cake was reslurried in a beaker with 700 g of aqueous 3% HCl solution for 2 hours. The polymer solid was filtered again on Büchner funnel. The solid was slurried with 700 g of DI water for 2 hours. The solid was then removed by filtration on a Büchner. The wet cake was rinsed on the filter with an additional 450 g of water. The wet cake was then reslurried in a beaker with 400 g of 0.5N sodium hydroxide aqueous solution for 2 hours. The wet cake was then reslurried in a beaker with 700 g of water and filtered on Büchner funnel. The last water washing step was repeated one time. The polymer reactor powder was the dried in a vacuum oven at 180° C. for 12 hours to give 79.4 g of white powder with an IV of 0.77 dL/g.
Grinding
PEKK was slowly fed to the feed port of a Retsch SR200 rotor mill, fitted with a 0.5 mm opening Conidur screen mounted in the reverse flow position and standard 6-blade rotor with a speed of 10,000 rpm.

The material was re-fed to the Retsch SR200 with a 0.08 mm screen, also in the reverse flow position with a standard 6-blade rotor at 10,000 rpm.

Once all the material had been ground through the 0.08 mm grinding screen, it was vacuum oven dried at 120° C. for about 16 hours.

The powder (PEKK #4) presents a $d_{0.9}$-value of 134 μm and $d_{0.5}$-value of 60 μm.

Td(1%) results are presented in Table 3 below.

Example 5

Comparative PEKK #6 (Comparative Example)

This example demonstrates the synthesis of a PEKK using a preparation process in the presence of a Lewis acid according to example C of patent application WO 2017/194855 and the preparation of the fine powder therefrom.
Polycondensation
The same procedure was followed as for PEKK #5.
Filtration and Washing
The solid was removed by filtration on a Büchner. The wet cake was then introduced, along with 800 g of a mixture 80/20 of methanol with DI water in a 2000 L 4-neck reaction flask fitted with a stirrer, a dry $N_2$ inlet tube, a thermocouple plunging in the reaction medium, and a Dean-Stark trap with a condenser. The slurry was heated up to 98° C. and approximately 600 g of liquid were collected in the Dean-Stark receiver. The mixture was cooled to down to room temperature and filtered on Büchner. The wet cake was reslurried in a beaker with 700 g of aqueous 3% HCl solution for 2 hours. The polymer solid was filtered again on Büchner funnel. The solid was slurried with 700 g of DI water for 2 hours. The solid was then removed by filtration on a Büchner. The wet cake was rinsed on the filter with an additional 450 g of water. The wet cake was then reslurried in a beaker with 400 g of 0.5N sodium hydroxide aqueous solution for 2 hours. The wet cake was then reslurried in a beaker with 700 g of water and filtered on Büchner funnel. The last water washing step was repeated one time. The polymer reactor powder was the dried in a vacuum oven at 180° C. for 12 hours to give 65.1 g of white powder with an IV of 0.99 dL/g.
Grinding
PEKK was slowly fed to the feed port of a Retsch SR200 rotor mill, fitted with a 0.5 mm opening Conidur screen mounted in the reverse flow position and standard 6-blade rotor with a speed of 10,000 rpm.

The material was re-fed to the Retsch SR200 with a 0.08 mm screen, also in the reverse flow position with a standard 6-blade rotor at 10,000 rpm.

Once all the material had been ground through the 0.08 mm grinding screen, it was vacuum oven dried at 120° C. for about 16 hours.

The powder presents a $d_{0.9}$-value of 134 μm and $d_{0.5}$-value of 60 μm.

Td(1%) results are presented in Table 3 below.

Results

|  | PEKK #4 (comp) | PEKK #5 (comp) | PEKK#6 (comp) |
|---|---|---|---|
| Td(1%) (° C.) | 496 | 489 | 163 |

The invention claimed is:

1. A polymer powder comprising at least one poly(ether ketone ketone) (PEKK) polymer, wherein the PEKK polymer comprises at least 95 mol. % of recurring units of formulas (M') and (P'), the mol. % being based on the total number of moles in the polymer:

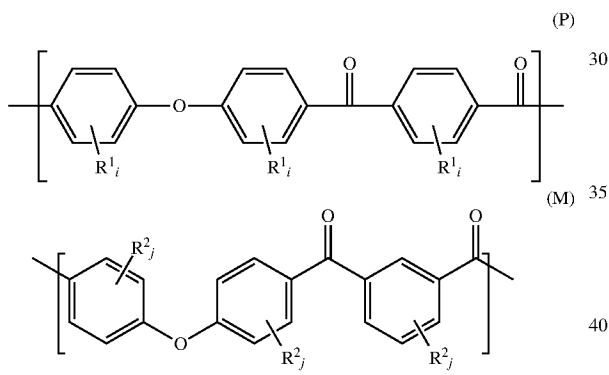

wherein the PEKK polymer has a Td(1%) of at least 500° C., as measured by thermal gravimetric analysis according to ASTM D3850, heating from 30° C. to 800° C. under nitrogen using a heating rate of 10° C./min, wherein the powder has a $d_{0.9}$-value less than 150 μm, as measured by laser scattering in isopropanol, wherein the powder has a bulk density ρB of at least 0.40, and wherein the powder is prepared by a method comprising the following steps:

Step a) polycondensing monomers (P'—OH), (M'-OH), (P'—F), and/or (M'-F), in a solvent:

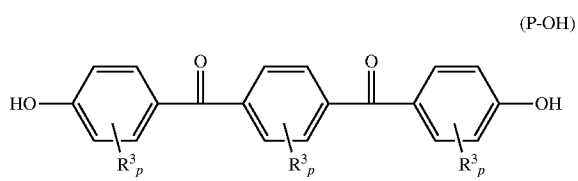

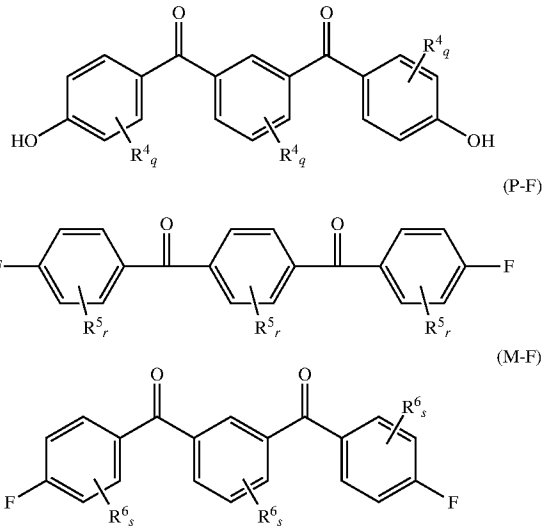

wherein a molar ratio of moles of (P'—OH) and (M'-OH) to moles of (P'—F) and (M'-F) is such that:

$$0.90 \leq \frac{n_{(P'-OH)} + n_{(M'-OH)}}{n_{(P'-F)} + n_{(M'-F)}} \leq 1.10$$

step b) extracting the solvent and salts, in order to obtain a powder, and step c) grinding the powder of step b) such that the powder comprises a $d_{0.9}$-value of less than 150 μm, as measured by laser scattering in isopropanol.

2. The powder of claim 1, further comprising from 0.01 to 10 wt. % of a flow agent.

3. The powder of claim 1, wherein the PEKK polymer has a molar ratio of recurring units (P') to recurring (M') of at least 1.2:1 to 4:1.

4. The powder of claim 1, having a BET surface area ranging from 0.1 to 5 m²/g, as measured by ISO 9277, at a soak temperature of 25° C.

5. The powder of claim 1, having a Tm ranging between 270 and 360° C., as measured by differential scanning calorimetry (DSC) according to ASTM D3418.

6. The powder of claim 1, having a Tg ranging between 145 and 170° C., as measured by differential scanning calorimetry (DSC) according to ASTM D3418.

7. The powder of claim 1, having a bulk density ρB of at least 0.42.

8. A method for manufacturing a three-dimensional (3D) object with an additive manufacturing system, comprising:
providing a part material comprising the powder according to claim 1, and
printing layers of the three-dimensional object from the part material.

9. The method of claim 8, wherein the step of printing layers comprises selective sintering by means of an electromagnetic radiation of the powder.

10. A method for manufacturing three-dimensional objects, comprising using the powder of claim 1 in a laser-sintering based additive manufacturing system.

11. A method for the production of a powder comprising at least a poly(ether ketone ketone) (PEKK) polymer comprising at least 50 mol. % of recurring units of formulas (M') and (P'), the mol. % being based on the total number of moles in the polymer:

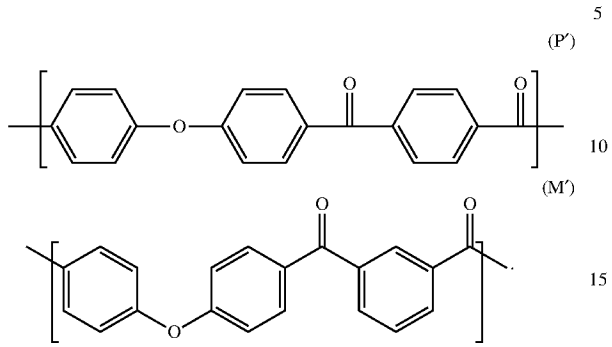

(P')

(M')

said method comprising:
preparing a PEKK polymer in a solvent in absence of a Lewis acid or in the presence of an amount of Lewis acid of less than 2 wt. %, based on the total weight of the monomers,
extracting salts and the solvent, in order to obtain a powder,
grinding the powder, in order to obtain a powder having a $d_{0.9}$-value less than 150 µm, as measured by laser scattering in isopropanol.

12. A method for the production of a powder comprising at least a poly(ether ketone ketone) (PEKK) polymer, said method comprising:
Step a) polycondensing monomers (P'—OH), (M'-OH), (P'—F) and/or (M'-F), in a solvent:

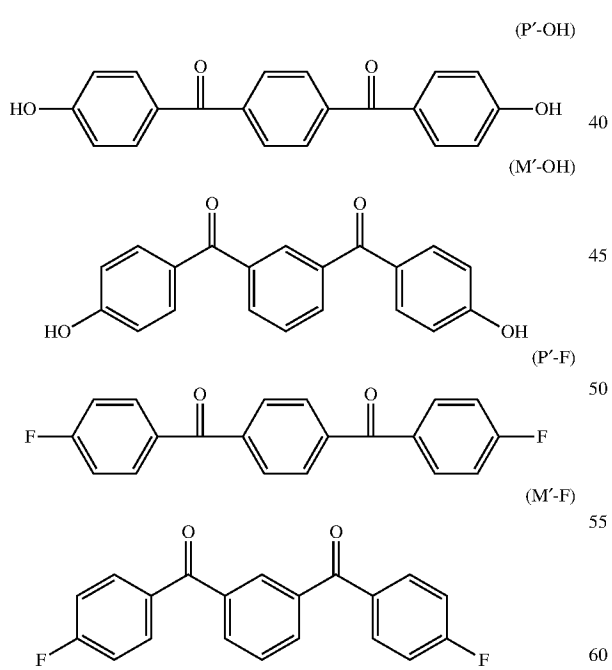

(P'-OH)

(M'-OH)

(P'-F)

(M'-F)

wherein the molar ratio of moles of (P'—OH) and (M'-OH) to moles of (P'—F) and (M'-F) is such that:

$$0.90 \leq \frac{n_{(P'-OH)} + n_{(M'-OH)}}{n_{(P'-F)} + n_{(M'-F)}} \leq 1.10$$

Step b) extracting the solvent and the salts, in order to obtain a powder; and
Step c) grinding the powder of step b), in order to obtain a powder having a $d_{0.9}$-value less than 150 µm, as measured by laser scattering in isopropanol.

13. The method of claim 12, wherein Step a) comprises:
Step a1) placing monomers (P'—OH) and (M'-OH), optionally monomers (P'—F) and/or (M'-F), in contact in a solvent;
Step a2) heating the reaction mixture to a first temperature of from 180 to 320° C.;
Step a3) heating the reaction mixture to a second temperature of from 300 to 340° C.; and
wherein at least one base is added to step a1) and/or between steps a2) and a3).

14. The method of claim 12, comprising:
Step a1) placing monomers (P'—OH) and (M'-OH), in contact in a solvent with at least one base;
Step a2) heating the reaction mixture to a first temperature of from 180 to 320° C.;
Step a2') adding monomers (P'—F) and/or (M'-F) to the reaction mixture;
Step a3) heating the reaction mixture to a second temperature of from 300 to 340° C.;
Step b) extracting the solvent and the salts, in order to obtain a powder; and
Step c) grinding the powder of step b).

15. The method of claim 12, comprising:
Step a1) placing monomers (P'—OH), (M'-OH) and (P'—F), in contact in a solvent;
Step a2) heating the reaction mixture to a first temperature of from 180 to 320° C.;
Step a2') adding at least one base to the reaction mixture;
Step a3) heating the reaction mixture to a second temperature of from 300 to 340° C.;
Step b) extracting the solvent and the salts, in order to obtain a powder; and
Step c) grinding the powder of step b).

16. The method of claim 12, further comprising a step consisting in adding a flow agent to the powder after step b) and/or after step c).

17. The method of claim 12, further comprising a step consisting in cooling the powder of step b) to a temperature below 25° C. before and/or during step c).

18. The powder of claim 1, wherein the PEKK polymer has a molar ratio of recurring units (P') to recurring (M') of at least 1.4:1 to 3:1.

19. The powder of claim 1, wherein the PEKK polymer has a molar ratio of recurring units (P') to recurring (M') of at least 1.4:1 to 1.86:1.

20. The powder of claim 1, wherein at least 99 mol. % of the recurring units in the PEKK are recurring units of formulae (M') and (P').

21. The powder of claim 1, wherein all the recurring units in the PEKK are recurring units of formulae (M') and (P').

22. The powder of claim 1, having a Tm ranging between 270 and 360° C., as measured by differential scanning calorimetry (DSC) according to ASTM D3418.

23. A part material comprising or consisting of:
at least 50 wt. % of the PEKK powder of claim 1;
from 0.01 wt. % to 10 wt. % of at least one flow agent (F), and optionally at least one additive (A) selected from the group consisting of fillers, colorants, dyes, pigments, lubricants, plasticizers, flame retardants, nucleating agents, heat stabilizers, light stabilizers, antioxidants, processing aids, fusing agents and electromagnetic absorbers, wherein wt. % is based on total weight of the part material.

* * * * *

UNITED STATES PATENT AND TRADEMARK OFFICE
CERTIFICATE OF CORRECTION

PATENT NO. : 11,851,526 B2
APPLICATION NO. : 16/624281
DATED : December 26, 2023
INVENTOR(S) : Chantal Louis et al.

It is certified that error appears in the above-identified patent and that said Letters Patent is hereby corrected as shown below:

In the Claims

At Column 21, Line number 24, Claim number 1, recurring units (M') and (P') should read -- (M) and (P) --

At Column 21, Line 56, Claim number 1, monomers (P'-OH) and (M'-OH) should read -- (P-OH) and (M-OH) --

At Column 21, Line 57, Claim number 1, monomers (P'-F) and (M'-F) should read -- (P-F) and (M-F) --

Signed and Sealed this
Thirteenth Day of February, 2024

Katherine Kelly Vidal
*Director of the United States Patent and Trademark Office*